United States Patent
Avant

(10) Patent No.: US 10,223,099 B2
(45) Date of Patent: Mar. 5, 2019

(54) SYSTEMS AND METHODS FOR PEER-TO-PEER BUILD SHARING

(71) Applicant: Palantir Technologies Inc., Palo Alto, CA (US)

(72) Inventor: Matthew Avant, Brooklyn, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/484,980

(22) Filed: Apr. 11, 2017

(65) Prior Publication Data

US 2018/0173514 A1   Jun. 21, 2018

Related U.S. Application Data

(60) Provisional application No. 62/437,559, filed on Dec. 21, 2016.

(51) Int. Cl.
```
G06F 8/65      (2018.01)
G06F 17/30     (2006.01)
G06F 8/71      (2018.01)
G06F 8/36      (2018.01)
G06F 9/50      (2006.01)
H04L 29/08     (2006.01)
```
(52) U.S. Cl.
CPC .............. G06F 8/65 (2013.01); G06F 8/71 (2013.01); G06F 17/30327 (2013.01); G06F 17/30595 (2013.01); G06F 17/30864 (2013.01); *G06F 8/36* (2013.01); *G06F 9/5061* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 5,724,575 A | 3/1998 | Hoover et al. | |
| 5,872,973 A | 2/1999 | Mitchell et al. | |
| 5,897,636 A | 4/1999 | Kaeser | |

(Continued)

FOREIGN PATENT DOCUMENTS

| | | |
|---|---|---|
| AU | 2014206155 | 12/2015 |
| EP | 0652513 | 5/1995 |

(Continued)

OTHER PUBLICATIONS

Gu, "SCOBA: Source Code Based Attestation on Custom Software", 2010, ACM (Year: 2010).*

(Continued)

*Primary Examiner* — Hossain M Morshed
(74) *Attorney, Agent, or Firm* — Sheppard Mullin Richter & Hampton LLP

(57) ABSTRACT

Systems and methods are provided for obtaining a build object over a communication network, the build object comprising at least a portion of a first build. The build object is stored locally. A build modification object is obtained over the communication network, the build modification object comprising a change between the first build and a second build. The build object updated using the build modification object obtained over the communication network. At least a portion of the updated build object is provided to a first peer build system over the communication network.

20 Claims, 8 Drawing Sheets

(56) References Cited

U.S. PATENT DOCUMENTS

| | | |
|---|---|---|
| 6,073,129 A | 6/2000 | Levine et al. |
| 6,094,653 A | 7/2000 | Li et al. |
| 6,161,098 A | 12/2000 | Wallman |
| 6,243,717 B1 | 6/2001 | Gordon et al. |
| 6,304,873 B1 | 10/2001 | Klein et al. |
| 6,366,933 B1 | 4/2002 | Ball et al. |
| 6,418,438 B1 | 7/2002 | Campbell |
| 6,510,504 B2 | 1/2003 | Satyanarayana |
| 6,549,752 B2 | 4/2003 | Tsukamoto |
| 6,560,620 B1 | 5/2003 | Ching |
| 6,574,635 B2 | 6/2003 | Stauber et al. |
| 6,745,382 B1 | 6/2004 | Zothner |
| 6,976,210 B1 | 12/2005 | Silva et al. |
| 6,980,984 B1 | 12/2005 | Huffman et al. |
| 7,058,648 B1 | 6/2006 | Lightfoot et al. |
| 7,111,231 B1 | 9/2006 | Huck et al. |
| 7,194,680 B1 | 3/2007 | Roy et al. |
| 7,461,158 B2 | 12/2008 | Rider et al. |
| 7,725,530 B2 | 5/2010 | Sah et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,761,407 B1 | 7/2010 | Stern |
| 7,814,084 B2 | 10/2010 | Hallett et al. |
| 7,962,495 B2 | 6/2011 | Jain et al. |
| 7,984,374 B2 | 7/2011 | Caro et al. |
| 8,041,714 B2 | 10/2011 | Aymeloglu et al. |
| 8,112,425 B2 | 2/2012 | Baum et al. |
| 8,126,848 B2 | 2/2012 | Wagner |
| 8,185,819 B2 | 5/2012 | Sah et al. |
| 8,229,902 B2 | 7/2012 | Vishniac et al. |
| 8,504,542 B2 | 8/2013 | Chang et al. |
| 8,676,857 B1 | 3/2014 | Adams et al. |
| 8,930,331 B2 | 1/2015 | McGrew et al. |
| 8,954,410 B2 | 2/2015 | Chang et al. |
| 9,009,827 B1 | 4/2015 | Albertson et al. |
| 9,043,696 B1 | 5/2015 | Meiklejohn et al. |
| 9,092,482 B2 | 7/2015 | Harris et al. |
| 9,116,975 B2 | 8/2015 | Shankar et al. |
| 9,208,159 B2 | 12/2015 | Stowe et al. |
| 9,230,280 B1 | 1/2016 | Maag et al. |
| 9,280,532 B2 | 3/2016 | Cicerone |
| 2001/0051949 A1 | 12/2001 | Carey et al. |
| 2001/0056522 A1 | 12/2001 | Satyanarayana |
| 2002/0091694 A1 | 7/2002 | Hrle et al. |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0130993 A1 | 7/2003 | Mendelevitch et al. |
| 2003/0212718 A1 | 11/2003 | Tester |
| 2004/0111410 A1 | 6/2004 | Burgoon et al. |
| 2004/0117345 A1 | 6/2004 | Bamford et al. |
| 2004/0117387 A1 | 6/2004 | Civetta et al. |
| 2004/0148301 A1 | 7/2004 | McKay et al. |
| 2005/0097441 A1 | 5/2005 | Herbach et al. |
| 2005/0108231 A1 | 5/2005 | Findleton et al. |
| 2005/0114763 A1 | 5/2005 | Nonomura et al. |
| 2005/0289524 A1 | 12/2005 | McGinnes |
| 2006/0074881 A1 | 4/2006 | Vembu et al. |
| 2006/0080316 A1 | 4/2006 | Gilmore et al. |
| 2006/0095521 A1 | 5/2006 | Patinkin |
| 2006/0106847 A1 | 5/2006 | Eckardt et al. |
| 2006/0116991 A1 | 6/2006 | Calderwood |
| 2006/0161558 A1 | 7/2006 | Tamma et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2007/0050429 A1 | 3/2007 | Goldring et al. |
| 2007/0061487 A1 | 3/2007 | Moore et al. |
| 2007/0143253 A1 | 6/2007 | Kostamaa et al. |
| 2007/0185850 A1 | 8/2007 | Walters et al. |
| 2007/0233756 A1 | 10/2007 | D'Souza et al. |
| 2007/0234320 A1* | 10/2007 | Gu .................. G06F 8/41 717/140 |
| 2007/0271317 A1 | 11/2007 | Carmel |
| 2008/0015970 A1 | 1/2008 | Brookfield et al. |
| 2008/0104060 A1 | 5/2008 | Abhyankar et al. |
| 2008/0104149 A1 | 5/2008 | Vishniac et al. |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0270316 A1 | 10/2008 | Guidotti et al. |
| 2008/0301378 A1 | 12/2008 | Carrie |
| 2009/0031247 A1 | 1/2009 | Walter et al. |
| 2009/0037417 A1 | 2/2009 | Shankar et al. |
| 2009/0106308 A1 | 4/2009 | Killian et al. |
| 2009/0164387 A1 | 6/2009 | Armstrong et al. |
| 2009/0172669 A1 | 7/2009 | Bobak et al. |
| 2009/0177962 A1 | 7/2009 | Gusmorino et al. |
| 2009/0240664 A1 | 9/2009 | Dinker et al. |
| 2009/0254971 A1 | 10/2009 | Herz |
| 2009/0271435 A1 | 10/2009 | Yako et al. |
| 2009/0313223 A1 | 12/2009 | Rantanen |
| 2009/0313311 A1 | 12/2009 | Hoffmann et al. |
| 2010/0036831 A1 | 2/2010 | Vemuri et al. |
| 2010/0070489 A1 | 3/2010 | Aymeloglu et al. |
| 2010/0076939 A1 | 3/2010 | Iwaki et al. |
| 2010/0082541 A1 | 4/2010 | Kottomtharayil |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0191884 A1 | 7/2010 | Holenstein et al. |
| 2010/0211550 A1 | 8/2010 | Daniello et al. |
| 2010/0211618 A1 | 8/2010 | Anderson et al. |
| 2010/0235606 A1 | 9/2010 | Oreland et al. |
| 2010/0283787 A1 | 11/2010 | Hamedi et al. |
| 2010/0318838 A1 | 12/2010 | Katano et al. |
| 2010/0325581 A1 | 12/2010 | Finkelstein et al. |
| 2011/0029498 A1 | 2/2011 | Ferguson et al. |
| 2011/0047540 A1 | 2/2011 | Williams et al. |
| 2011/0153592 A1 | 6/2011 | DeMarcken |
| 2011/0161132 A1 | 6/2011 | Goel et al. |
| 2011/0173619 A1 | 7/2011 | Fish |
| 2011/0184813 A1 | 7/2011 | Barne et al. |
| 2011/0258158 A1 | 10/2011 | Resende et al. |
| 2011/0258242 A1 | 10/2011 | Eidson et al. |
| 2011/0270812 A1 | 11/2011 | Ruby |
| 2012/0072825 A1 | 3/2012 | Sherkin et al. |
| 2012/0123989 A1 | 5/2012 | Yu et al. |
| 2012/0124179 A1 | 5/2012 | Cappio et al. |
| 2012/0136804 A1 | 5/2012 | Lucia |
| 2012/0150791 A1 | 6/2012 | Willson |
| 2012/0159307 A1 | 6/2012 | Chung et al. |
| 2012/0216051 A1* | 8/2012 | Boivie .................. G06F 21/6209 713/190 |
| 2012/0330908 A1 | 12/2012 | Stowe et al. |
| 2013/0036346 A1 | 2/2013 | Cicerone |
| 2013/0060742 A1 | 3/2013 | Chang et al. |
| 2013/0097130 A1 | 4/2013 | Bingol et al. |
| 2013/0151388 A1 | 6/2013 | Falkenborg et al. |
| 2013/0304770 A1 | 11/2013 | Boero et al. |
| 2013/0318060 A1 | 11/2013 | Chang et al. |
| 2014/0149272 A1 | 5/2014 | Hirani et al. |
| 2014/0181833 A1 | 6/2014 | Bird et al. |
| 2014/0324876 A1 | 10/2014 | Konik et al. |
| 2014/0344231 A1 | 11/2014 | Stowe et al. |
| 2015/0039886 A1 | 2/2015 | Kahol et al. |
| 2015/0089353 A1 | 3/2015 | Folkening |
| 2015/0106347 A1 | 4/2015 | McGrew et al. |
| 2015/0112956 A1 | 4/2015 | Chang et al. |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0261817 A1 | 9/2015 | Harris et al. |

(56) References Cited

U.S. PATENT DOCUMENTS

| | | | |
|---|---|---|---|
| 2015/0331689 A1* | 11/2015 | Blahaerath | G06F 8/71 717/106 |
| 2015/0341467 A1 | 11/2015 | Lim et al. | |
| 2016/0034545 A1 | 2/2016 | Shankar et al. | |
| 2016/0062555 A1 | 3/2016 | Ward et al. | |
| 2016/0147730 A1 | 5/2016 | Cicerone | |

FOREIGN PATENT DOCUMENTS

| | | |
|---|---|---|
| EP | 2555126 | 2/2013 |
| EP | 2863326 | 4/2015 |
| EP | 2891992 | 7/2015 |
| EP | 2993595 | 3/2016 |
| WO | WO 2012/025915 | 3/2012 |

OTHER PUBLICATIONS

Anonymous, "BackTult—JD Edwards One World Version Control System", in 1 page, Jul. 23, 2007.

Antoshenkov, Gennady, "Dictionary-Based Order-Preserving String Compression", The VLDB Journal, pp. 26-39, 1997.

Apache HBase, 2011, The Apache Sofware Foundation (1 page).

Baker et al., "Megastore: Providing Scalable, Highly Available Storage for Interactive Services", 5th Biennial Conference on Innovative Data Systems Research (CIDR '11), Asilomar, California, Jan. 9-12, 2011.

Bernstein et al., "Hyder—A Transactional Record Manager for Shared Flash", 5th Biennial Conference on Innovative Data Systems Research (CIDR '11), vol. 12, Asilomar, California, Jan. 9-12, 2011.

Chang et al., "Bigtable: A Distributed Storage System for Structured Data", Google, Inc., OSDI'06: Seventh Symposium on Operating System Design and Implementation, Seattle, WA, Nov. 2006.

Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.

Devanbu et al., "Authentic Third-party Data Publication", http://www.cs.ucdavis.edu/~devanbu/authdbpub.pdf, p. 19, 2000.

Dreyer et al., "An Object-Oriented Data Model for a Time Series Management System", Proceedings of the 7th International Working Conference on Scientific and Statistical Database Management, p. 12, Charlottesville, Virginia, USA, Sep. 28-30, 1994.

Elmasri et al., "Fundamentals of Database Systems", Fourth Edition, pp. 455-491, 2004.

Hogue et al., "Thresher: Automating the Unwrapping of Semantic Content from the World Wide Web", 14th International Conference on World Wide Web, WWW 2005: Chiba, Japan, May 10-14, 2005.

Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7-Dynamic Ontology Management System (Design)", Information Societies Technology Programme, pp. 1-27.

Mentzas et al., "An Architecture for Intelligent Assistance in the Forecasting Process", Proceedings of the Twenty-Eighth Hawaii International Conference on System Sciences, vol. 3, pp. 167-176, Jan. 3-6, 1995.

Miklau et al., "Securing History: Privacy and Accountability in Database Systems", 3rd Biennial Conference on Innovative Data Systems Research (CIDR), pp. 387-396, Asilomar, California, Jan. 7-10, 2007.

Niepert et al., "A Dynamic Ontology for a Dynamic Reference Work", Joint Conference on Digital Libraries, pp. 1-10, Vancouver, British Columbia, Jun. 17-22, 2007.

Nierman et al., "Evaluating Structural Similarity in XML Documents", 6 pages, 2002.

Notice of Allowance for U.S. Appl. No. 13/196,788 dated Dec. 18, 2015.

Notice of Allowance for U.S. Appl. No. 13/826,228 dated Mar. 27, 2015.

Notice of Allowance for U.S. Appl. No. 14/192,767 dated Dec. 16, 2014.

Notice of Allowance for U.S. Appl. No. 14/278,963 dated Sep. 2, 2015.

Notice of Allowance for U.S. Appl. No. 14/451,221 dated Aug. 4, 2015.

Notice of Allowance for U.S. Appl. No. 14/504,103 dated May 18, 2015.

Notice of Allowance for U.S. Appl. No. 14/734,772 dated Apr. 27, 2016.

Notice of Allowance for U.S. Appl. No. 14/746,671 dated Jan. 21, 2016.

Notice of Allowance for U.S. Appl. No. 14/849,454 dated May 25, 2016.

Official Communication for European Patent Application No. 14189344.6 dated Feb. 20, 2015.

Official Communication for European Patent Application No. 14199182.8 dated Mar. 13, 2015.

Official Communication for European Patent Application No. 15183721.8 dated Nov. 23, 2015.

Official Communication for Netherlands Patent Application No. 2012436 dated Nov. 6, 2015.

Official Communication for U.S. Appl. No. 13/196,788 dated Oct. 23, 2015.

Official Communication for U.S. Appl. No. 13/196,788 dated Nov. 25, 2015.

Official Communication for U.S. Appl. No. 14/278,963 dated Jan. 30, 2015.

Official Communication for U.S. Appl. No. 14/451,221 dated Apr. 6, 2015.

Official Communication for U.S. Appl. No. 14/504,103 dated Feb. 5, 2015.

Official Communication for U.S. Appl. No. 14/504,103 dated Mar. 31, 2015.

Official Communication for U.S. Appl. No. 14/578,389 dated Oct. 21, 2015.

Official Communication for U.S. Appl. No. 14/578,389 dated Apr. 22, 2016.

Official Communication for U.S. Appl. No. 14/580,218 dated Jun. 26, 2015.

Official Communication for U.S. Appl. No. 14/580,218 dated Jun. 7, 2016.

Official Communication for U.S. Appl. No. 14/726,211 dated Apr. 5, 2016.

Official Communication for U.S. Appl. No. 14/734,772 dated Jul. 24, 2015.

Official Communication for U.S. Appl. No. 14/734,772 dated Oct. 30, 2015.

Official Communication for U.S. Appl. No. 14/746,671 dated Sep. 28, 2015.

Official Communication for U.S. Appl. No. 14/746,671 dated Nov. 12, 2015.

Official Communication for U.S. Appl. No. 14/841,338 dated Feb. 18, 2016.

Official Communication for U.S. Appl. No. 14/961,830 dated May 20, 2016.

Official Communication for U.S. Appl. No. 14/996,179 dated May 20, 2016.

Peng et al., "Large-scale Incremental Processing Using Distributed Transactions and Notifications", Proceedings of the 9th USENIX Symposium on Operating Systems Design and Implementation, USENIX, p. 14, 2010.

Quest, "Toad for ORACLE 11.6—Guide to Using Toad", pp. 1-162, Sep. 24, 2012.

The Apache Cassandra Project.

Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.

(56) References Cited

OTHER PUBLICATIONS

Wikipedia, "Federated Database System," Sep. 7, 2013, retrieved from the internet on Jan. 27, 2015 http://en.wikipedia.org/w/index.php?title=Federated_database_system&oldid=571954221.

Wollrath et al., "A Distributed Object Model for the Java System", Conference on Object-Oriented Technologies and Systems, pp. 219-231, Jun. 17-21, 1996.

Yang et al., "HTML Page Analysis Based on Visual Cues", A129, pp. 859-864, 2001.

* cited by examiner

SYSTEMS AND METHODS FOR PEER-TO-PEER BUILD SHARING

CROSS REFERENCE TO RELATED APPLICATIONS

This application claims the benefit under 35 U.S.C. § 119(e) of U.S. Provisional Application Ser. No. 62/437,559 filed Dec. 21, 2016, the content of which is incorporated by reference in its entirety into the present disclosure.

BACKGROUND

Technical Field

This disclosure relates to technical approaches for managing data repositories, and more particularly to technical approaches for peer-to-peer build sharing of data in a repository system associated with one or more peer-to-peer nodes.

Description of Related Art

Under conventional approaches, build systems (e.g., software build systems) have a single source. For example, a software build system may be implemented as a server system, and compiled builds may be fetched from a single source of the server system. However, as the number of clients or build sizes increase, a bottle-neck may be created by the server system, which may result in poor performance, high resources utilization, and/or system crashes.

SUMMARY

A claimed solution rooted in computer technology overcomes problems specifically arising in the realm of computer technology. In various implementations, a computing system is configured to obtain one or more build objects (e.g., a portion of a build or an entire build) from multiple sources. For example, the computing system can obtain build objects from one or more peer build systems, in addition to, or instead of, an originating build system. In some embodiments, a peer build system can create (or, re-create) an entire build from build objects obtained from one or more other peer build systems without ever having to communicate with an originating build system. As new builds are generated by an originating build system, the relative change between the builds can be provided to one or more peer build systems over a communication network, rather than providing the entire new build over the communication network. This technical solution can, for example, reduce latency and bandwidth requirements associated with generating new builds. In some embodiments, one or more peer build systems are geographically close to each other (e.g., within a particular data center), and take advantage of network locality and/or low-latency networks to improve performance. This technical solution can improve overall build system performance when, for example, the originating build system is executing at a different geographic location relative to the peer build systems.

Various embodiments of the present disclosure include systems, methods, and non-transitory computer readable media configured to obtain a build object over a communication network, the build object comprising at least a portion of a first build. The build object is stored (e.g., locally). A build modification object is obtained over the communication network, the build modification object comprising a change between the first build and a second build. The build object is updated using the build modification object obtained over the communication network. At least a portion of the updated build object is provided to a first peer build system over the communication network.

In some embodiments, the build object comprises a hash tree structure. In related embodiments, the build object comprises a plurality of content items, each of the content items comprising any of a file or a binary, each of the content items stored as an element of the hash tree structure.

In some embodiments, the build object obtained over the communication network comprises the build object obtained from a second peer build system over the communication network, and the build modification object obtained over the communication network comprises the build modification object obtained over the communication from an originating build system storing a complete instance of the first build and a complete instance of the second build.

In some embodiments, the build object comprises an immutable build object, and the updating the build object comprises generating a second build object using the build modification object.

In some embodiments, the systems, methods, and non-transitory computer readable media are configured to predict one or more respective build objects stored by a plurality of respective peer build systems; receive a build action request; select a third peer build system from the plurality of respective peer build systems based on the build action request and the prediction; obtain a second build object from the third peer build system based on the build action request; determine whether the second build object satisfies the build action request; if the second build object satisfies the build action request, process the build action request using the second build object; and if the second build object does not satisfy the build action request, iteratively obtain one or more different build objects from one or more different peer build systems from the plurality of respective build systems until a particular build object of the one or more different build objects satisfies the build action request; and process the build action request using the particular build object of the one or more different build objects.

In some embodiments, the selecting a third peer build system from the plurality of respective peer build systems based on the build action request and the prediction comprises selecting a particular peer build system predicted to store a particular build object indicated by the build action request. In related embodiments, the particular peer build system is selected based on a latency relative to one or more other peers of the plurality of peers predicted to store the particular build object indicated by the build action request.

In some embodiments, the systems, methods, and non-transitory computer readable media are configured to obtain one or more additional build objects from one or more additional peer build systems; and create a complete instance of the second build from the updated build object and the one or more additional build objects, the complete instance of the second build comprising a hash tree structure.

In some embodiments, the build object is stored in a Merkle tree structure, and the build object comprises a portion of a software build.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

Under conventional approaches, build systems (e.g., software build systems) have a single source. For example, a software build system may be implemented as a server system, and compiled builds are fetched from a single source of the server system. However, as the number of clients or build sizes increase, a bottle-neck may be created by the server system, which may result in poor performance, high resources utilization, or system crashes.

A claimed solution rooted in computer technology overcomes problems specifically arising in the realm of computer technology. In various implementations, a computing system is configured to obtain one or more build objects (e.g., a portion of a build or an entire build) from multiple sources. For example, the computing system can obtain build objects from one or more peer build systems, in addition to, or instead of, an originating build system. In some embodiments, a peer build system can create (or, re-create) an entire build from build objects obtained from one or more other peer build systems without ever having to communicate with an originating build system. As new builds are generated by an originating build system, the relative change between the builds can be provided to one or more peer build systems over a communication network, rather than providing the entire new build over the communication network. This technical solution can, for example, reduce latency and bandwidth requirements associated with generating new builds. In some embodiments, one or more peer build systems are geographically close to each other (e.g., within a particular data center), and take advantage of network locality and/or low-latency networks to improve performance. This technical solution can improve overall build system performance when, for example, the originating build system is executing at a different geographic location relative to the peer build systems.

Figure 1:
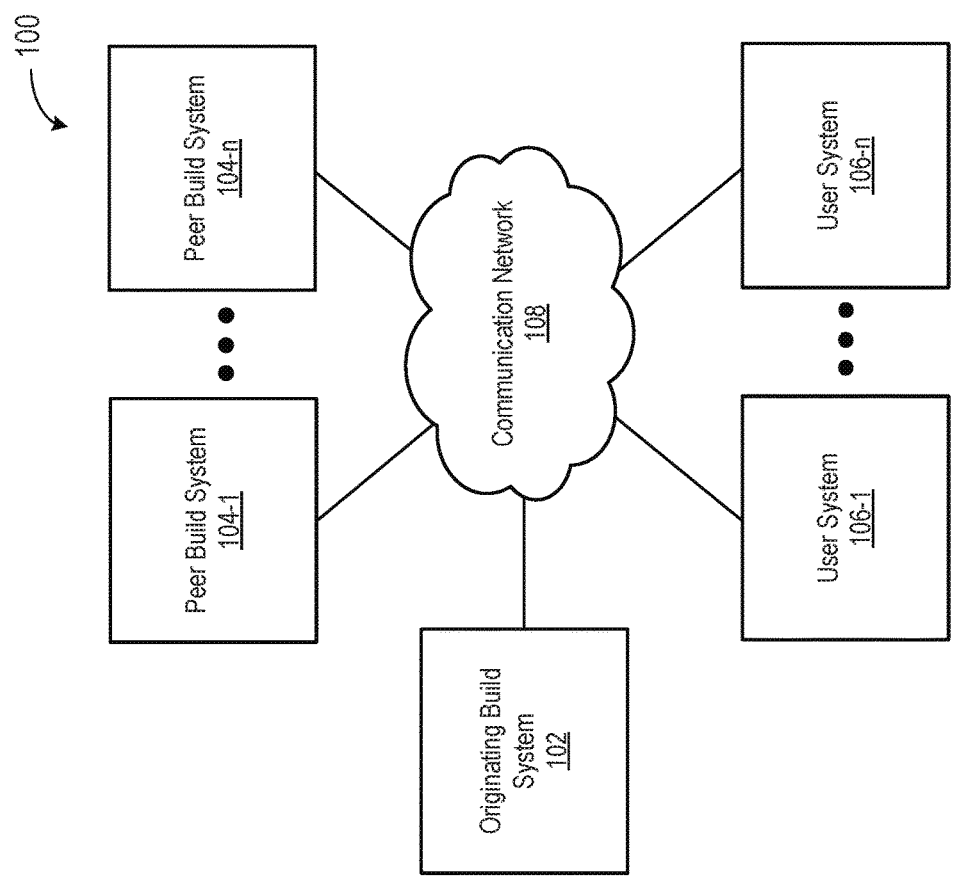
FIG. 1 depicts a diagram of an example of a system for peer-to-peer build object sharing according to some embodiments.

FIG. 1 depicts a diagram of an example of a system 100 for peer-to-peer build object sharing according to some embodiments. The example system 100 shown in FIG. 1 includes an originating build system 102, peer build systems 104-1 to 104-n (individually, the peer build system 104, collectively, the peer build systems 104), user systems 106-1 to 106-n (individually, the user system 106, collectively, the user systems 106), and a communication network 108.

In the example of FIG. 1, the originating build system 102 functions to store one or more builds (e.g., software builds). For example, functionality of the originating build system 102 can be performed by one or more workstations, server systems, desktop computers, laptop computers, mobile devices, and the like. The originating build system 102 may store a build as one or more build objects. Accordingly, a build object may comprise a complete build or a portion of a build.

In some embodiments, a build object includes a plurality of content items. For example, a content item can include one or more files (e.g., source code files), one or more binaries (e.g., BLOBs), one or more artifacts (e.g., software artifacts), and the like. In various embodiments, build objects comprise one or more tree structures. As used herein, tree structures can include directory or non-directory tree structures, hash trees, and Merkle trees. For example, content items may be stored in leaf nodes of a tree structure, although in some embodiments, they may be stored in other nodes of the tree structure.

In some embodiments, builds objects are immutable. This may help ensure build integrity without having to maintain complex versioning systems or account for caching or other memory errors. Thus, for example, when a build is updated to a current version, the systems described herein may generate new corresponding build objects, rather than modifying existing build objects. Accordingly, it will be appreciated that "updating," as used herein, may include generating a new object (e.g., build object), and/or modifying an existing object (e.g., if an object is not immutable).

In some embodiments, the originating build system 102 functions to generate builds and/or build objects. For example, the originating build system 102 may compile source code into binary code or artifacts, package binary code, and generate BLOBs. In other embodiments, a build is generated by one or more other systems, and the existing build is provided to the originating build system 102 (e.g., over a communication network). In such embodiments, the originating build system 102 can generate one or more build objects from the existing build.

In some embodiments, the originating build system 102 functions to determine a change between build objects. For example, a first build object may have been generated using a set of content items, and a second build object may have been generated after a subset of the content items have changed (e.g., in response to a user system updating a file or binary). In order to determine a change between the build objects, the originating build system 102 can compare the first and second build objects. For example, the originating build system 102 can compare hash values of nodes within corresponding build objects to determine which portions of the build objects have changed. In some embodiments, the originating build system 102 can store the change in one or more build modification objects. For example, a build modification object can include a portion of the hash tree structure that changed relative to another build object (e.g., pervious iteration of the build object).

In some embodiments, the originating build system 102 functions to receive build action requests, process build action requests, and respond to build action requests. As used herein, a build action request can include one or more requests to generate a build and/or build object, provide a build and/or build object, or portion thereof, perform automated testing (e.g., unit testing) or other build automation processes, perform continuous integration actions or continuous delivery actions, or other requests to perform functionality described herein. The originating build system 102 may process build action requests received in response to user input (e.g., a user requesting a new build) and/or automatically (e.g., in response to a continuous integration action).

In the example of FIG. 1, the peer build systems 104 function to facilitate peer-to-peer sharing of builds and corresponding build objects. For example, functionality of the peer build systems 104 can be performed by one or more workstations, server systems, desktop computers, laptop computers, mobile devices (e.g., smartphone, cell phone, smartwatch, tablet computer, etc.), and the like. In some embodiments, the peer build systems 104 function to obtain build objects from one or more systems (e.g., other peer build systems 104 or an originating build system 102), provide build objects to one or more systems (e.g., other peer build systems 104), store build objects, and process build action requests. For example, a peer build system 104 may obtain unchanged build objects from one or more other peer build systems 104, and obtain changed build objects from an originating build system 102.

In the example of FIG. 1, the user systems 106 function to allow users to generate content items, request build actions, and communicate with other systems described herein. For example, the users systems 106 can generate or update source code files, add or remove peer build systems to a network (or, "swarm") of peer build systems, create swarms, modify configurations of peer build systems or originating build systems, and the like. In various embodiments, the functionality of the user systems 106 can be performed by one or more workstations, server systems, desktop computers, laptop computers, or mobile devices. The user systems 106 may function to execute local and/or networked-based applications (e.g., web browsers, remote communication clients, or software development platforms and environments).

In the example of FIG. 1, the communication network 108 represents one or more computer networks (e.g., LAN, WAN, or the like) or other transmission mediums. The one or more computer networks may have the same or different performance characteristics (e.g., latency, bandwidth, and the like). The communication network 108 can provide communication between any of the originating build system 102, the peer build systems 104, and the user systems 106. In some embodiments, the communication network can provide communication between components of the systems 102-106. In some embodiments, the communication network 108 comprises one or more computing devices, routers, cables, buses, and/or other network topologies. In some embodiments, the communication network 108 may be wired and/or wireless. In various embodiments, the communication network 108 may comprise the Internet, one or more wide area networks (WANs) or local area networks (LANs), one or more networks that may be public, private, IP-based, non-IP based, and so forth. Communication networks and transmission mediums are discussed further herein.

Figure 2:
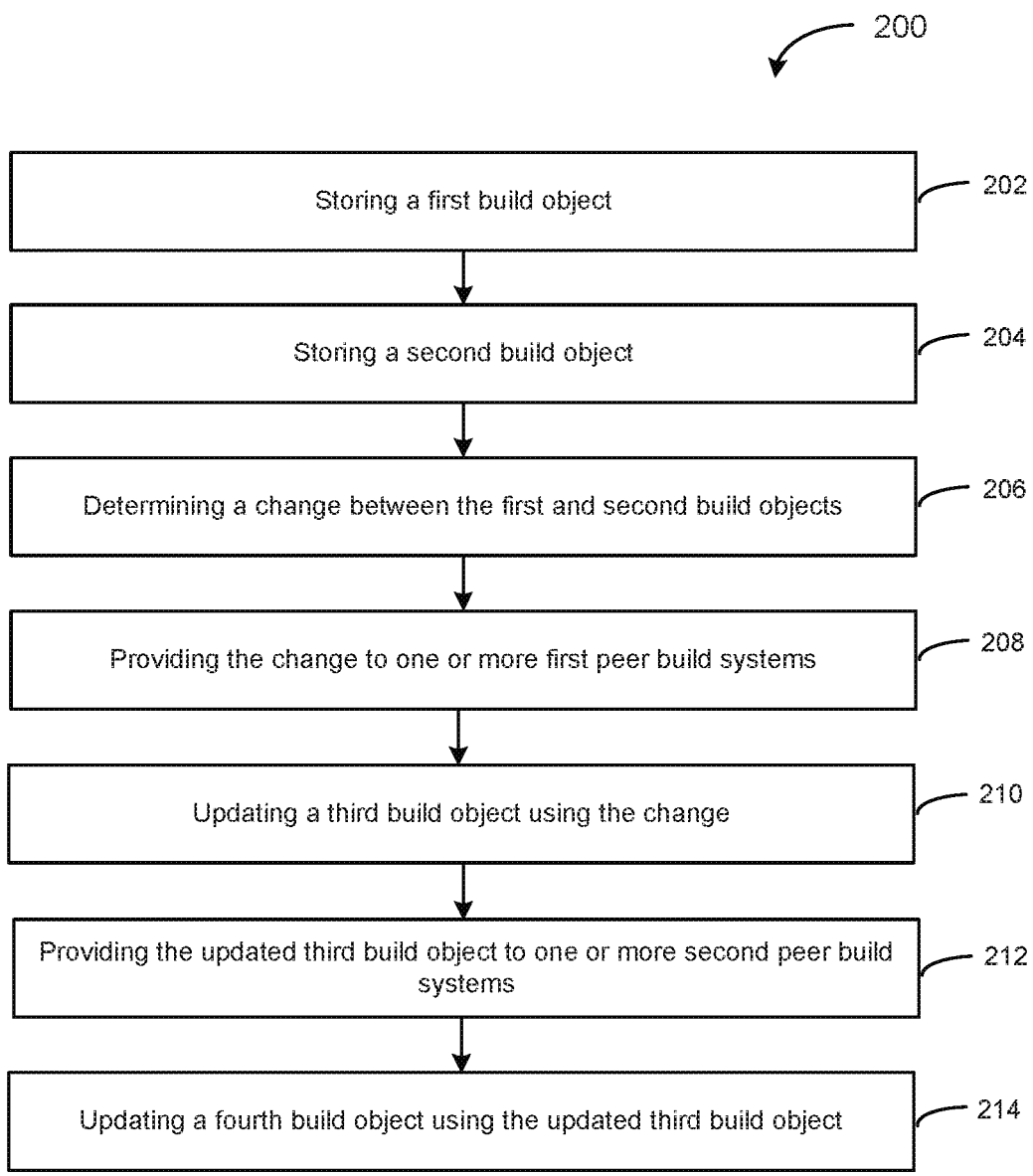
FIG. 2 depicts a flowchart of an example of a method for peer-to-peer build object sharing according to some embodiments.

FIG. 2 depicts a flowchart 200 of an example of a method for peer-to-peer build object sharing according to some embodiments. In this and other flowcharts, the flowchart 200 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 202, an originating build system stores a first build object. For example, the first build object may comprise a complete build generated from a set of content items. In step 204, the originating build system stores a second build object. For example, the second build object may comprise a complete build generated in response to a modification to one or more of the content items. In step 206, the originating build system determines a change between the first and second build objects. In step 208, the originating build system provides the change to one or more first peer build systems. For example, the originating build system may provide the change in response to a build action request. In step 210, at least one of the one or more peer build systems update a third build object using the change. For example, the third build object may comprise at least a portion of the first build object. In step 212, the at least one peer build system provides at least a portion of the updated third build object to one or more second peer build systems. For example, the updated third build object may be provided in response to a build action request being processed by one or more of the second peer build systems. In step 214, the one or more second peer build systems update a fourth build object using the at the least the portion of the updated third build object. For example, the fourth build object may comprise at least a portion of the first build object.

Figure 3:
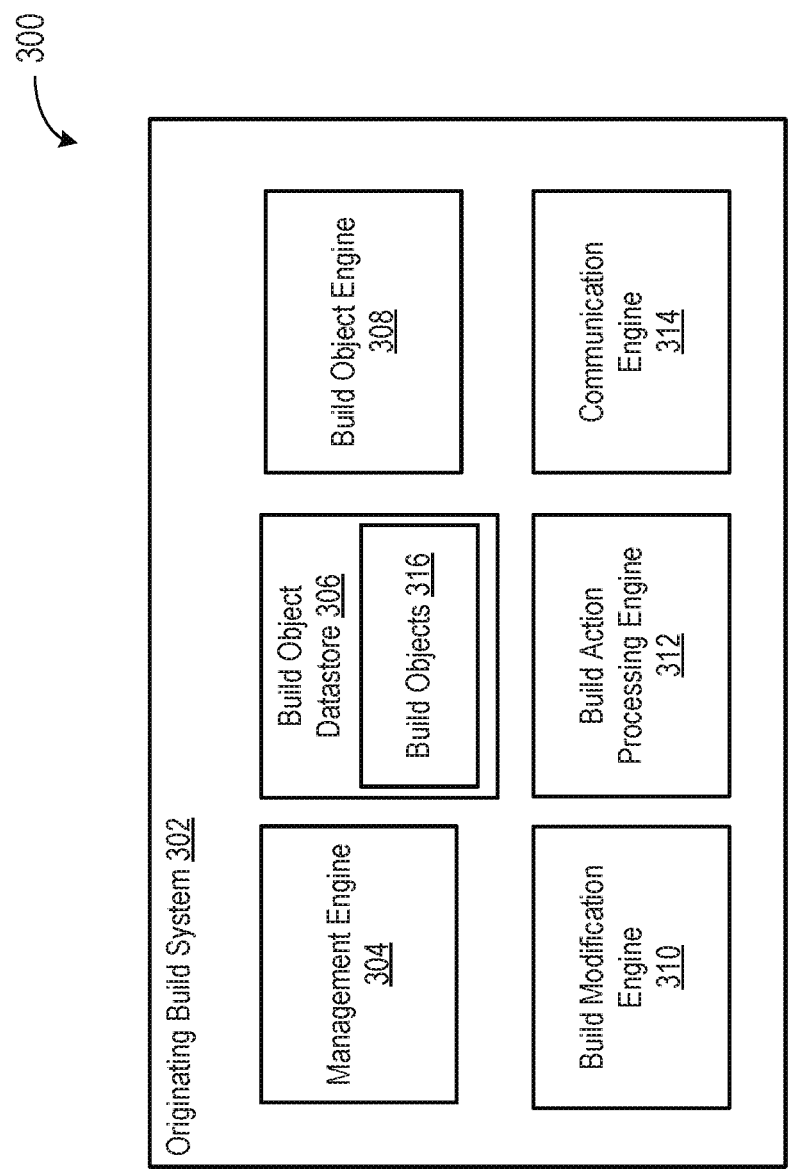
FIG. 3 depicts a diagram of an example of an originating build system according to some embodiments.

FIG. 3 depicts a diagram 300 of an example of an originating build system 302 according to some embodiments. In the example of FIG. 3, the originating build system 302 includes a management engine 304, a build object datastore 306, a build object engine 308, a build modification engine 310, a build action processing engine 312, and a communication engine 314.

In the example of FIG. 3, the management engine 304 functions to manage (e.g., create, read, update, delete, or otherwise access) build objects 316 stored in the build object datastore 306. The management engine 304 can perform any of these operations manually (e.g., by a user interacting with a GUI), automatically (e.g., triggered by one or more of the engines 308-314, discussed below), or both. In some embodiments, the management engine 304 comprises a library of executable instructions which are executable by a processor for performing any of the aforementioned management operations. The build object datastore 306 may be any structure and/or structures suitable for storing the build objects 316. For example, the build object datastore 306, as well as the other datastore described herein, may comprise a relational database, an active database, a self-referential database, a table, a matrix, an array, a flat file, a non-relational No-SQL system, or other system suitable for storing tree structured data.

In some embodiments, the build objects 316 include of a variety of hashes, data attributes, methods, or other parameters. As discussed elsewhere herein, the build objects 316 may comprise tree structures, such as hash tree structures or Merkle tree structures. In some embodiments, each build object 316 includes multiple content items stored in corresponding nodes (e.g., leaf nodes) of a hash tree. In some embodiments, the content items are only stored in leaf nodes, although in other embodiments, it may be otherwise.

In the example of FIG. 3, the build object engine 308 functions to generate builds objects. The build object engine 308 may generate build objects 316 in response to build action requests, user input, or build trigger conditions. Build trigger conditions may include generating one or more new build objects 316 when an existing build has changed. For example, the build object engine 308 may estimate a change between a current build object 316 and a predicted build object based on a current state of the content items associated with the current build. The build object engine 308 may compare the estimated change to a threshold condition (e.g., estimated change is greater than a predetermined percentage), and generate new build objects 316 based on the comparison. For example, if a current build object 316 was generated from a particular set of content items, and if a current state of that set of content items indicates that and a threshold percentage of the content items (e.g., 2%) are either new or modified, the build object engine 308 may automatically generate a new build object 316.

In the example of FIG. 3, the build modification engine 310 functions to determine one or more changes between two or more build objects. In some embodiments, the build modification engine 310 generates one or more build modification objects based on the one or more changes. For example, a build modification object may comprise a type of build object 316, and may be stored in the build object datastore 306. Accordingly, a build modification object may comprise a tree structure storing at least a portion of a build that has changed relative to one or more other builds. In one example, the build modification engine 310 may provide build modification objects to remote systems (e.g., peer build systems) instead of providing an entire build, which may reduce bandwidth usage, and reduce an amount of time for remote systems to update local build objects (e.g., that are used for processing build action requests).

In the example of FIG. 3, the build action processing engine 312 functions to handle (e.g., receive, process, and respond to) build action requests. For example, the build action processing engine 312 may receive requests to generate new build objects, and trigger one or more components of the originating build system 302 (e.g., build object engine 308) to generate new objects.

In the example of FIG. 3, the communication engine 314 functions to send requests, transmit and, receive communications, and/or otherwise provide communication with one or a plurality of systems. In some embodiments, the communication engine 314 functions to encrypt and decrypt communications. The communication engine 314 may function send requests to and receive data from a system through a network or a portion of a network. Depending upon implementation-specific or other considerations, the communication engine 314 may send requests and receive data through a connection, all or a portion of which may be a wireless connection. The communication engine 314 may request and receive messages, and/or other communications from associated systems.

Figure 4:
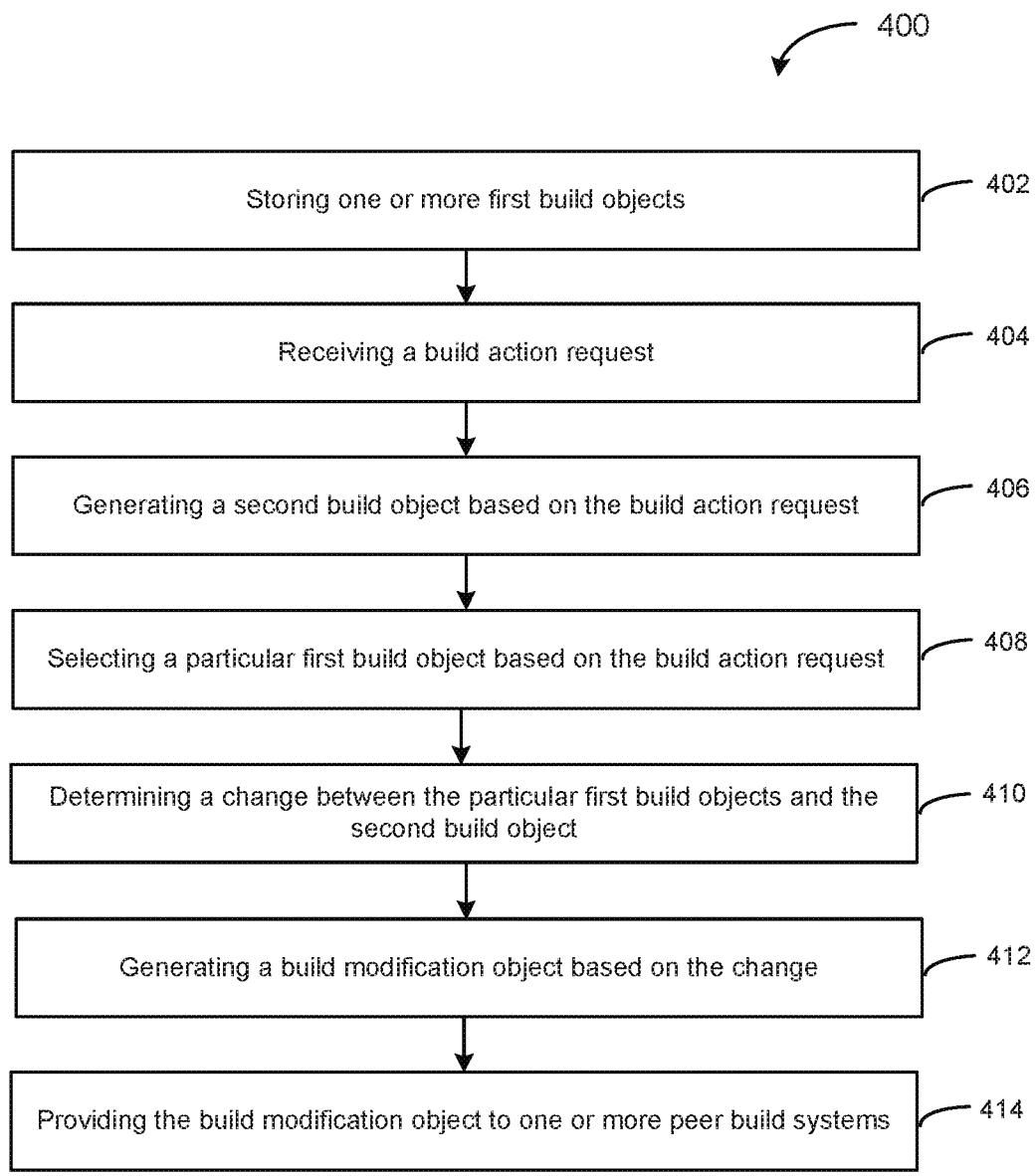
FIG. 4 depicts a flowchart of an example of a method of operation of an originating build system for determining modifications of build objects and providing the modifications to one or more peer build systems according to some embodiments.

FIG. 4 depicts a flowchart 400 of an example of a method of operation of an originating build system for determining modifications of build objects and providing the modifications to one or more peer build systems according to some embodiments.

In step 402, an originating build system stores one or more first build objects. In some embodiments, a management engine stores the one or more first build objects in a build object datastore. In step 404, the originating build system receives a build action request. In some embodiments, a build action processing engine receives the request. In step 406, the originating build system generates a second build object based on the build action request. In some embodiments, a build object engine generates second build object. In step 408, the originating build system selects a particular first build object from the one or more first build objects based on the build action request. In some embodiments, the build action processing engine selects the build particular first build object. In step 410, the originating build system determines a change between the particular first build object and the second build object. In some embodiments, a build modification engine determines the change. In step 412, the originating build system generates a build modification object based on the change. In some embodiments, the build modification engine determines the change. In step 414, the originating build system provides the build modification to one or more peer build systems. In some embodiments, a communication engine provides the build modification to one or more peer build systems over a communication network.

Figure 5:
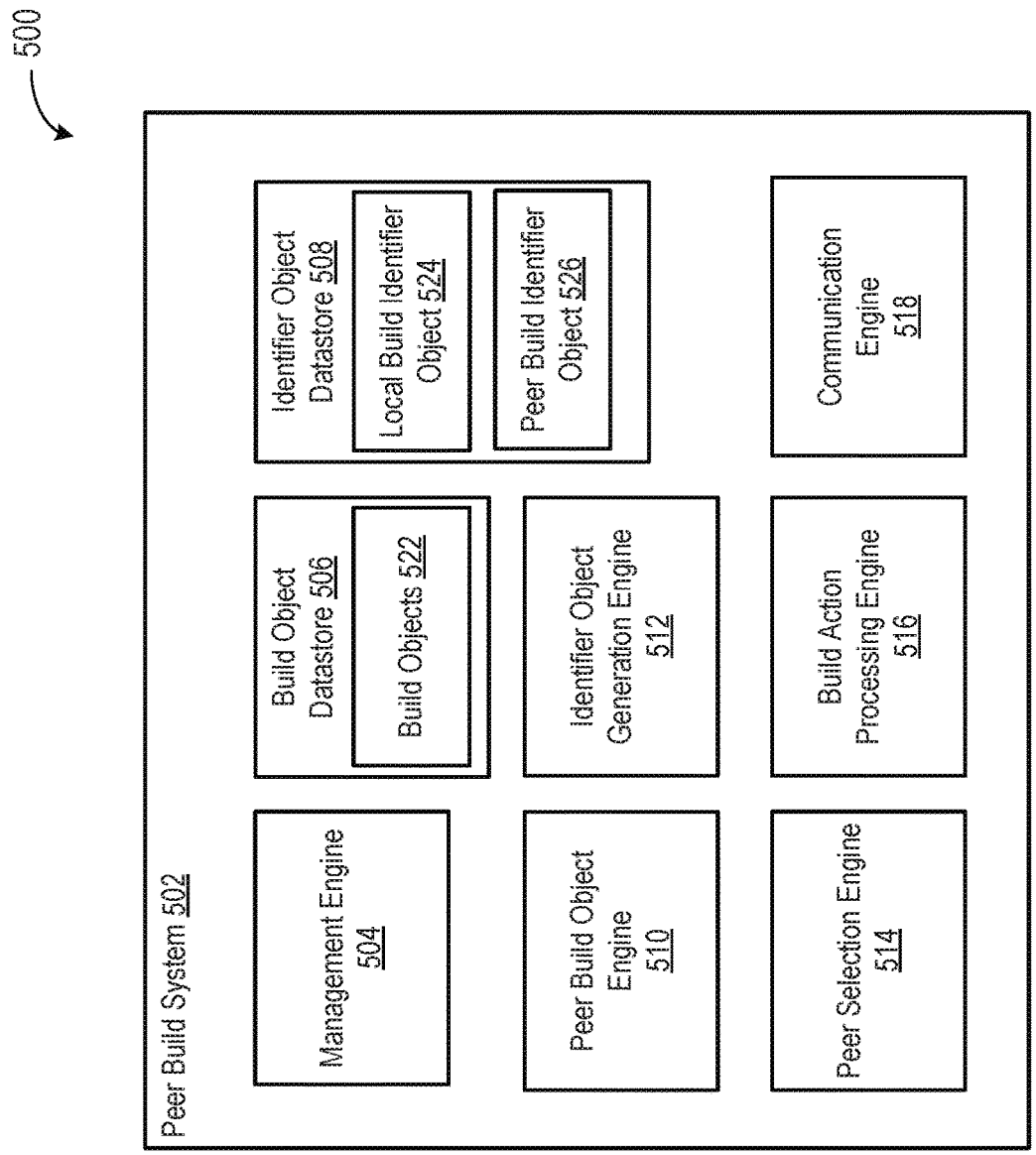
FIG. 5 depicts a diagram of an example of a peer build system according to some embodiments.

FIG. 5 depicts a diagram 500 of an example of a peer build system 502 according to some embodiments. In the example of FIG. 5, the peer build system includes a management engine 504, a build object datastore 506, an identifier object datastore 508, a peer build object engine 510, an identifier object generation engine 512, a peer selection engine 514, a build action processing engine 516, and a communication engine 518.

In the example of FIG. 5, the management engine 504 functions to manage (e.g., create, read, update, delete, or otherwise access) build objects 522 stored in the build object datastore 506, local build identifier object 524 stored in the identifier object datastore 508, and peer build identifier object 526 stored in the identifier object datastore 508. The management engine 504 can perform any of these operations manually (e.g., by a user interacting with a GUI), automatically (e.g., triggered by one or more of the engines 510-518, discussed below), or both. In some embodiments, the management engine 504 comprises a library of executable instructions which are executable by a processor for performing any of the aforementioned management operations. The build object datastore 506 may be any structure and/or structures suitable for storing the build objects 522, the local build identifier object 524, and the peer build identifier object 526.

In some embodiments, the build objects 522 store tree structured data, and include of a variety of hashes, data attributes, methods, or other parameters. The build objects 522 may comprise the build objects described elsewhere herein, or copies of those build objects.

In some embodiments, the local build identifier object 524 indicates an estimation (or, "prediction") of one or more build objects 522 stored, or otherwise maintained, local to the peer build system 502. For example, the local build identifier object 524 may include a variety of hashes, data attributes, methods, or other parameters. In some embodiments, the local build identifier object 524 comprises a probabilistic data structure (e.g., a bloom filter) that may allow other systems (e.g., peer build systems, originating build systems, or user systems) to estimate builds objects, or state thereof, stored by the peer build system 502.

In some embodiments, the peer build identifier object 526 indicates an estimation of one or more build objects stored by one or more other peer build systems. For example, the peer build identifier object 526 may include a variety of hashes, data attributes, methods, or other parameters. In some embodiments, the peer build identifier object 526 comprises a list, or other suitable structure, of one or more other systems (e.g., peer build systems or originating build systems) and the estimated build objects stored by those systems. This can allow for example, the peer build system 502 to predict the builds objects stored by the other systems. In some embodiments, the local build identifier object 524 comprises the local build identifier objects of one or more other peer build systems.

In some embodiments, the peer build identifier object 526 indicates performance characteristics associated with one or more of the other peer systems. For example, the peer build identifier object 526 may indicate a latency for some or all of the other peers systems. This may allow, for example, the peer build system 502 to obtain build objects from peer build systems associated with the lowest relative latency.

In the example of FIG. 5, the peer build object engine 510 functions to create a build or a portion of a build using build objects stored locally and/or obtained from remote systems (e.g., other peer build systems or originating build systems). For example, the peer build object engine 510 may obtain unchanged build objects (e.g., build objects that are unchanged relative to corresponding build objects stored by an originating build system) from one or more other peer build systems, and obtain changed build objects and/or build modification objects from an originating build system.

In some embodiments, the peer build object engine 510 functions to provide one or more build objects 522 to one or more other systems (e.g., peer build systems). For example, the peer build object engine 510 may provide build objects 522 in response to a request from another systems, or in response to a trigger condition. For example, if the peer build system 502 receives a change from an originating build system or another peer build system, it may propagate that change to one or more other peer build systems.

In the example of FIG. 5, the identifier object generation engine 512 functions to generate the local build identifier object 524 and the peer build identifier object 526. For example, the identifier object generation engine 512 may generate the local build identifier object 524 from some or all of the hashes of the locally stored build objects 522, and generate the peer build identifier object 526 from the local build identifier objects of one or more other systems (e.g., peer build systems or originating build systems).

In the example of FIG. 5, the peer selection engine 514 functions to determine other peer build system from which to obtain build objects, and/or determine other peer build systems to receive some or all of the build objects 522. For example, the peer selection engine 514 may identify a set of peer build systems using the estimated build objects indicated by the peer build identifier object 526, and order the set of the peer build systems based on the performance characteristics indicated by the peer build identifier object 526. The peer selection engine 514 may identify the peer build system having the most suitable performance characteristics (e.g., lowest latency). In some embodiments, the peer selection engine 514 may further function to determine whether an obtained build object is the correct build object. For example, the peer build system 502 may use hashes of the obtained build object to perform the determination. If an incorrect build object is obtained (e.g., because the peer build identifier object 526 incorrectly predicted the build objects stored by that peer build system), the peer build system 502 may retry until the correct build object is obtained.

In the example of FIG. 5, the build action processing engine 516 functions to handle (e.g., receive, process, and respond to) build action requests. For example, the build action processing engine 516 may receive build action requests to perform unit testing or other build automation processes. The build action processing engine 516 may perform the actions (e.g., unit testing) and trigger other components of the peer build system 502 in support of those action. For example, the build action processing engine 516 trigger peer object engine to obtain build objects from other systems in order to create a build, or portion thereof, on which to perform unit testing.

In the example of FIG. 5, the communication engine 314 functions to send requests, transmit and, receive communications, and/or otherwise provide communication with one or a plurality of systems. In some embodiments, the communication engine 314 functions to encrypt and decrypt communications. The communication engine 314 may function send requests to and receive data from a system through a network or a portion of a network. Depending upon implementation-specific or other considerations, the communication engine 314 may send requests and receive data through a connection, all or a portion of which may be a wireless connection. The communication engine 314 may request and receive messages, and/or other communications from associated systems.

Figure 6:
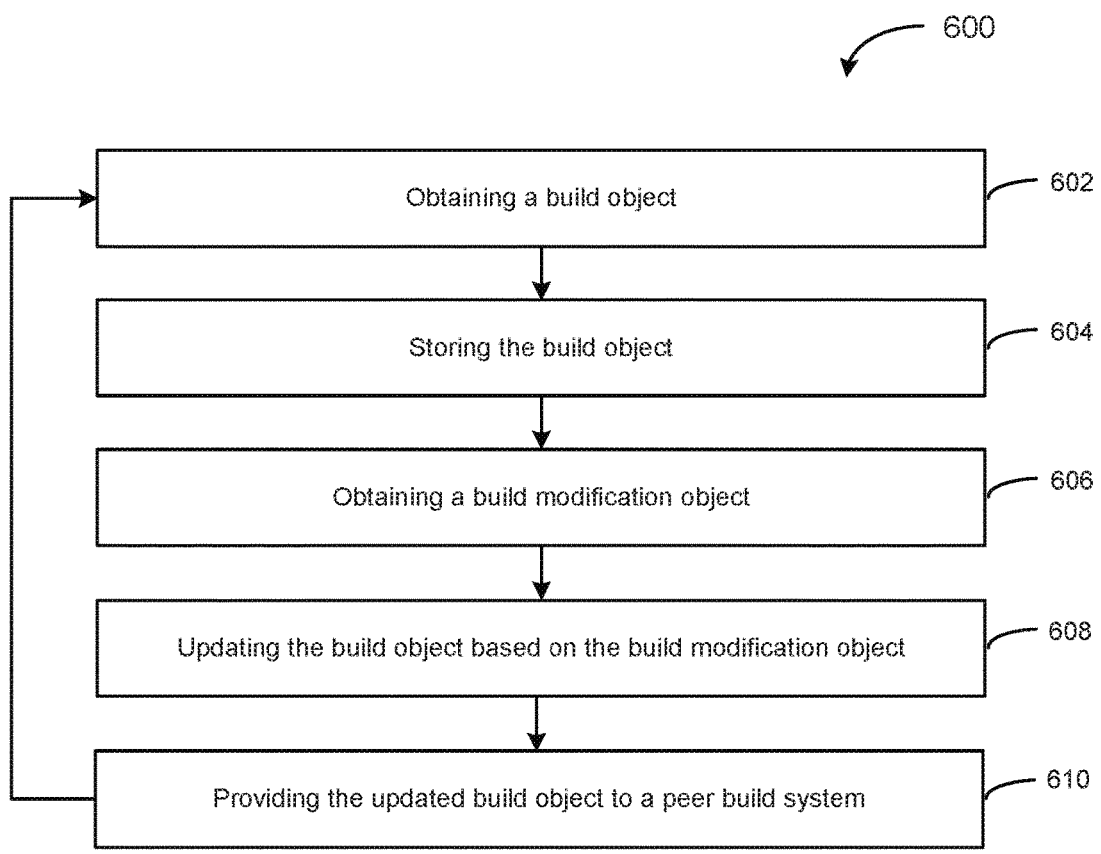
FIG. 6 depicts a flowchart of an example of a method of operation of a peer build system for peer-to-peer build object sharing according to some embodiments.

FIG. 6 depicts a flowchart 600 of an example of a method of operation of a peer build system for peer-to-peer build object sharing according to some embodiments.

In step 602, a peer build system obtains a build object. For example, the build object may be obtained from one or more other peer build systems, or an originating build system. In some embodiments, a communication engine and/or or a peer build object engine obtains the build object over a communication network. In step 604, the peer build system stores the build object. In some embodiments, a management engine locally stores the build object in a build object datastore of the peer build system. In step 606, the peer build system obtains a build modification object. In some embodiments, the communication engine and/or the build object engine obtains from the build modification object from an originating build system over the communication network. In step 608, the peer build system updates the build object based on the modification objection. For example, the peer build system may replace the build object with the modification object, or generate a new object that includes the unchanged portions of the build object and the relative changes of the build modification object. In some embodiments, the peer build object engine updates the build object. In step 610, the peer build system provides the updated build object to one or more other peer build systems. In some embodiments, the communication engine and/or peer build engine provides the updated build object a peer build system identified by a peer selection engine.

Figure 7:
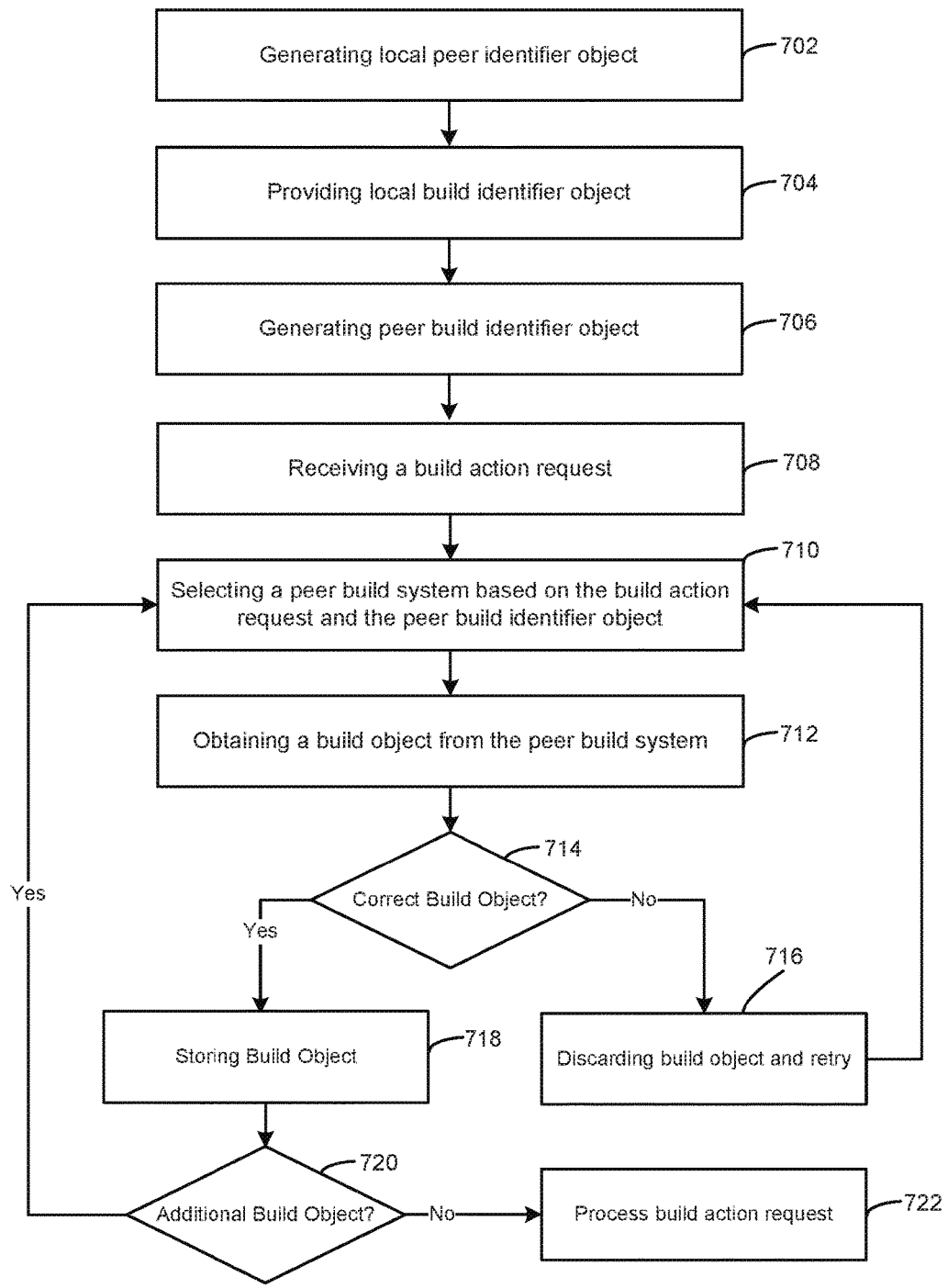
FIG. 7 depicts a flowchart of an example of a method of operation of a peer build system for peer-to-peer build object sharing according to some embodiments.

FIG. 7 depicts a flowchart 700 of an example of a method of operation of a peer build system for peer-to-peer build object sharing according to some embodiments.

In step 702, a peer build system generates a local build identifier object. For example, the peer build system may generate the local build identifier object in response to connecting to a swarm of peer build systems. In some embodiments, an identifier object generation engine generates the local build identifier object.

In step 704, the peer build system provides the local build identifier object to one or more other systems (e.g., peer build systems and/or originating build systems). For example, the peer build system may provide the local build identifier object to some or all of the currently connected peer build systems. In some embodiments, the peer build system may automatically provide the local build identifier object (e.g., in response to joining a swarm) and/or in response to a request from a peer build system. In some embodiments, a communication engine provides the local build identifier object to some or all of the other currently connected peer build systems.

In step 706, the peer build system generates a peer build identifier object. For example, the peer build system may obtain a local build identifier object from each currently connected peer build systems, and/or as additional peer build systems connect to the swarm. In various embodiments, the obtained local build identifier object may comprise a delta local build identifier object. For example, if a peer build system already has a local build identifier object for a particular peer build system, the peer build system may obtain a change relative to the currently stored local build identifier object, as opposed to the entire object. In some embodiments, local build identifier objects and/or delta local build identifier objects may be compressed. In some embodiments, the communication engine obtains the local build identifier objects, and an identifier object generation engine generates the peer build identifier object from the obtained local build identifier objects.

In step 708, the peer build system receives a build action request. For example, a build action request may be received from a user system, an originating build system, or another peer build system. In some embodiments, the communication engine and/or a build action processing engine receives the build action request.

In step 710, the peer build system selects another peer build system based on the build action request and the peer build identifier object. For example, the peer build system can identify a set of one or more particular peer build systems predicted to have a particular build object needed to perform one or more build actions indicated in the build action request. The peer build system may select the other peer system from the set of one or more particular peer systems based on performance characteristics of the particular peer system, e.g., as indicated by the peer build identifier object. In some embodiments, a peer selection engine selection the other peer build system.

In step 712, the peer build system obtains a build from the selected peer system. For example, the build object may be a build needed to perform one or more build actions indicated in the build action request. In some embodiments, a communication engine and/or peer build object engine obtains the build object from the selected peer system.

In step 714, the peer build system determines whether obtained build is the correct build (e.g., to satisfy the build action request). In some embodiments, the peer selection engine performs the determinations. In step 716, if the obtained build object is not the correct build object, the peer build system may discard the obtained build object and return to step 710 and retry with another build object (e.g., from a next peer build system based indicated by the peer build system object).

In step 718, the peer build system stores the object if the build object is correct and determines whether to obtain additional build objects, e.g., to satisfy the build action request (step 720). In some embodiments, the build action processing engine determines whether to obtain additional build objects. If the peer build system determines not to obtain additional build objects, the peer build system processes the build action request (step 722). Alternatively, if the peer build system determines to obtain at one additional build object, the method may return to step 710.

Hardware Implementation

Figure 8:
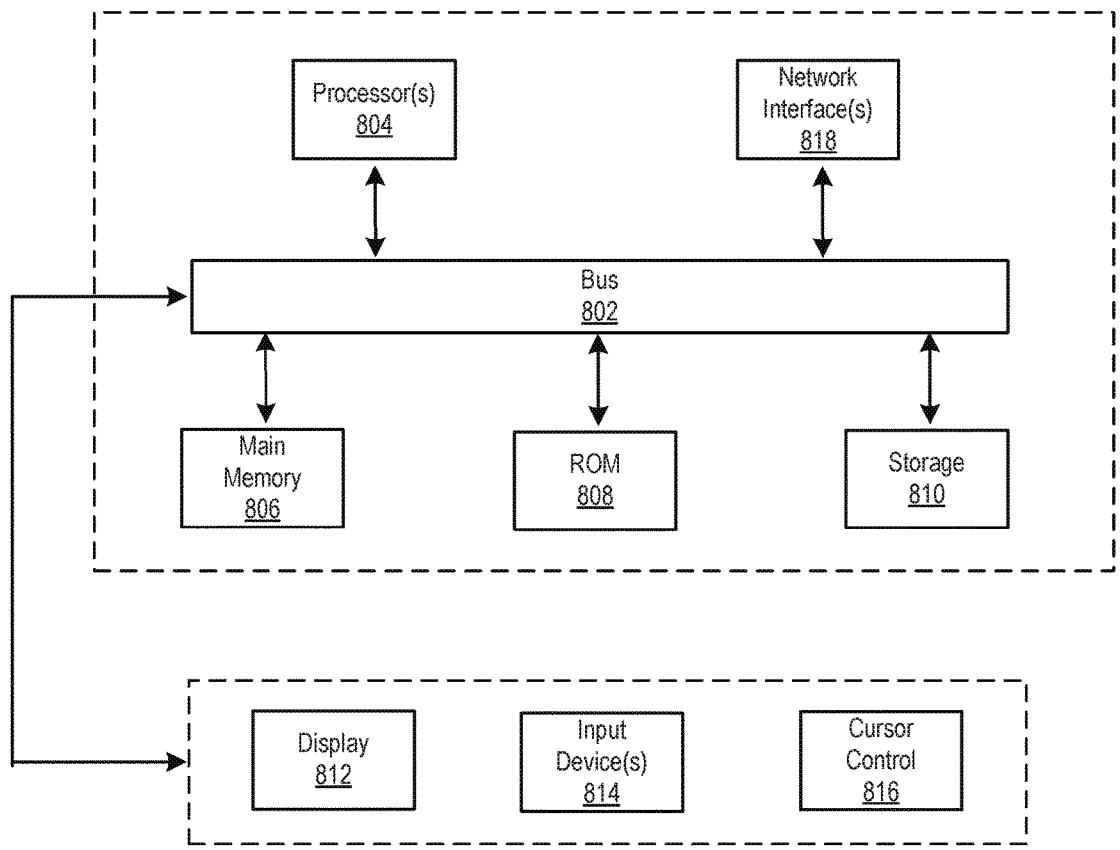
FIG. 8 depicts a block diagram of an example of a computer system upon which any of the embodiments described herein may be implemented.

FIG. 8 depicts a block diagram of an example of a computer system 800 upon which any of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently.

The datastores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A software build system for generating new software builds based on build objects obtained from a peer build system comprising:
   one or more processors; and
   memory storing instructions that, when executed by the one or more processors, cause the system to perform:
      obtaining a current build object over a communication network, the current build object comprising a portion of a current build, and the current build object comprising any of one or more hashes, data attributes, methods, parameters, tree structures and multiple content items;
      storing the current build object;
      estimating a change between the current build object and a predicted build object based on a current state of one or more content items associated with the current build;
      comparing the estimated change to a threshold condition;
      generating, in response to the comparison, one or more new build objects;

determining one or more changes between two or more build objects;

generating one or more build modification objects based on the one or more determined changes between the two or more build objects, wherein at least one of the one or more build modification objects comprise a tree structure storing at least a portion of a build that has changed relative to one or more other builds;

providing the one or more build modification objects to at least one peer build system without providing an entire build, thereby reducing time for the at least one peer system to update one or more local build objects, the one or more local build objects capable of being used for processing build action requests.

2. The system of claim 1, wherein a build object comprises a hash tree structure.

3. The system of claim 2, wherein the build object comprises a plurality of content items, each of the content items comprising any of a file or a binary, each of the content items stored as an element of the hash tree structure.

4. The system of claim 1, wherein the obtaining the current build object over the communication network comprises obtaining the current build object from a second peer build system over the communication network, and the obtaining the one or more build modification objects over the communication network comprises obtaining the one or more build modification objects over the communication from an originating build system storing a complete instance of the first build and a complete instance of a second build.

5. The system of claim 1, wherein a build object comprises an immutable build object, and the updating the one or more local build object comprises generating a second build object using the one or more build modification objects.

6. The system of claim 1, wherein the instructions further cause the system to perform:

predicting one or more respective build objects stored by a plurality of respective peer build systems; receiving a build action request;

selecting a third peer build system from the plurality of respective peer build systems based on the build action request and the prediction;

obtaining a second build object from the third peer build system based on the build action request; determining whether the second build object satisfies the build action request;

if the second build object satisfies the build action request, processing the build action request using the second build object; and if the second build object does not satisfy the build action request, iteratively obtaining one or more different build objects from one or more different peer build systems from the plurality of respective build systems until a particular build object of the one or more different build objects satisfies the build action request; and processing the build action request using the particular build object of the one or more different build objects.

7. The system of claim 6, wherein the selecting a third peer build system from the plurality of respective peer build systems based on the build action request and the prediction comprises selecting a particular peer build system predicted to store a particular build object indicated by the build action request.

8. The system of claim 7, wherein the particular peer build system is selected based on a latency relative to one or more other peers of the plurality of peers predicted to store the particular build object indicated by the build action request.

9. The system of claim 1, wherein the instructions further cause the system to perform:

obtaining one or more additional build objects from one or more additional peer build systems; and creating a complete instance of a second build from the updated one or more build objects and the one or more additional build objects, the complete instance of the second build comprising a hash tree structure.

10. The system of claim 1, wherein storing a build object comprises storing the build object in a Merkle tree structure, the build object comprising a portion of a software build.

11. A method being implemented by a computing system including one or more physical processors and storage media storing machine-readable instructions, the method comprising:

obtaining a current build object over a communication network, the build object comprising a portion of a current build, and the current build object comprising any of one or more hashes, data attributes, methods, parameters, tree structures and multiple content items;

storing the current build object;

estimating a change between the current build object and a predicted build object based on a current state of one or more content items associated with the current build;

comparing the estimated change to a threshold condition;

generating, in response to the comparison, one or more new build objects;

determining one or more changes between two or more build objects;

generating one or more build modification objects based on the one or more determined changes between the two or more build objects, wherein at least one of the one or more build modification objects comprise a tree structure storing at least a portion of a build that has changed relative to one or more other builds;

providing the one or more build modification objects to at least one peer build system without providing an entire build, thereby reducing time for the at least one peer system to update one or more local build objects, the one or more local build objects capable of being used for processing build action requests.

12. The method of claim 11, wherein a build object comprises a hash tree structure.

13. The method of claim 12, wherein the build object comprises a plurality of content items, each of the content items comprising any of a file or a binary, each of the content items stored as an element of the hash tree structure.

14. The method of claim 11, wherein the obtaining the current build object over the communication network comprises obtaining the current build object from a second peer build system over the communication network, and the obtaining the one or more build modification objects over the communication network comprises obtaining the one or more build modification objects over the communication from an originating build system storing a complete instance of the first build and a complete instance of a second build.

15. The method of claim 11, wherein a build object comprises an immutable build object, and the updating the one or more build objects comprises generating a second build object using the one or more build modification objects.

16. The method of claim 11, further comprising:
predicting one or more respective build objects stored by a plurality of respective peer build systems; receiving a build action request;
selecting a third peer build system from the plurality of respective peer build systems based on the build action request and the prediction;
obtaining a second build object from the third peer build system based on the build action request;
determining whether the second build object satisfies the build action request; if the second build object satisfies the build action request, processing the build action request using the second build object; and
if the second build object does not satisfy the build action request, iteratively obtaining one or more different build objects from one or more different peer build systems from the plurality of respective build systems until a particular build object of the one or more different build objects satisfies the build action request; and processing the build action request using the particular build object of the one or more different build objects.

17. The method of claim 16, wherein the selecting a third peer build system from the plurality of respective peer build systems based on the build action request and the prediction comprises selecting a particular peer build system predicted to store a particular build object indicated by the build action request.

18. The method of claim 17, wherein the particular peer build system is selected based on a latency relative to one or more other peers of the plurality of peers predicted to store the particular build object indicated by the build action request.

19. The method of claim 11, further comprising:
obtaining one or more additional build objects from one or more additional peer build systems; and
creating a complete instance of second build from the updated one or more local build objects and the one or more additional build objects, the complete instance of the second build comprising a hash tree structure.

20. A non-transitory computer readable medium comprising instructions that, when executed, cause one or more processors to perform:
obtaining a current build object over a communication network, the current build object comprising a portion of a current build, and the build current object comprising any of one or more hashes, data attributes, methods, parameters, tree structures and multiple content items;
storing the current build object;
estimating a change between the current build object and a predicted build object based on a current state of one or more content items associated with the current build;
comparing the estimated change to a threshold condition;
generating, in response to the comparison, one or more new build objects;
determining one or more changes between two or more build objects;
generating one or more build modification objects based on the one or more determined changes between the two or more build objects, wherein at least one of the one or more build modification objects comprises a tree structure storing at least a portion of a build that has changed relative to one or more other builds;
providing the one or more build modification objects to at least one peer build system without providing an entire build, thereby reducing time for the at least one peer system to update one or more local build objects, the one or more local build objects capable of being used for processing build action requests.

* * * * *